United States Patent
Agus et al.

(10) Patent No.: US 11,382,000 B2
(45) Date of Patent: Jul. 5, 2022

(54) TRAFFIC DISTRIBUTION OVER AGGREGATED RADIO LINKS

(71) Applicant: TELECOM ITALIA S.p.A., Milan (IT)

(72) Inventors: Mauro Agus, Turin (IT); Andrea Allasia, Turin (IT); Chiara Moriondo, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/637,507

(22) PCT Filed: Aug. 13, 2018

(86) PCT No.: PCT/EP2018/071890
§ 371 (c)(1),
(2) Date: Feb. 7, 2020

(87) PCT Pub. No.: WO2019/034587
PCT Pub. Date: Feb. 21, 2019

(65) Prior Publication Data
US 2020/0245191 A1    Jul. 30, 2020

(30) Foreign Application Priority Data
Aug. 17, 2017 (IT) .......... 102017000094008

(51) Int. Cl.
*H04W 28/08* (2009.01)
*H04L 47/125* (2022.01)
(Continued)

(52) U.S. Cl.
CPC .......... *H04W 28/08* (2013.01); *H04L 47/125* (2013.01); *H04L 47/14* (2013.01);
(Continued)

(58) Field of Classification Search
CPC ..... H04L 45/24; H04L 45/245; H04L 47/125; H04L 47/14; H04L 47/24; H04L 47/2408; H04L 47/2433
See application file for complete search history.

(56) References Cited

U.S. PATENT DOCUMENTS

2016/0095132 A1    3/2016    Hodroj et al.
2016/0226773 A1*   8/2016    Sundaram ............... H04L 45/24
(Continued)

FOREIGN PATENT DOCUMENTS

GB    2532788 A    6/2016

OTHER PUBLICATIONS

International Search Report dated Sep. 11, 2018, in PCT/EP2018/071890, 3 pages.

*Primary Examiner* — Pao Sinkantarakorn
(74) *Attorney, Agent, or Firm* — Oblon, McClelland, Maier & Neustadt, L.L.P.

(57) ABSTRACT

A method for distributing packets of a data traffic over aggregated radio links connecting a node of a packet-switched wireless communication network to a further node of the packet-switched wireless communication network includes, at an indoor unit of the node, configuring at least one set of distribution rules indicating, for each of a first radio link and a second radio link of the aggregated radio links, an association between the radio link and a subset of values of a priority parameter carried within the packets. The method also includes, upon reception of a packet of the data traffic, distributing the packet over the first radio link or the second radio link on the basis of the priority parameter value carried within the packet and the associations.

12 Claims, 6 Drawing Sheets

(51) Int. Cl.
*H04W 28/02* (2009.01)
*H04L 47/2425* (2022.01)
*H04L 47/2441* (2022.01)
*H04W 72/12* (2009.01)

(52) U.S. Cl.
CPC ...... *H04L 47/2433* (2013.01); *H04L 47/2441* (2013.01); *H04W 72/1242* (2013.01)

(56) References Cited

U.S. PATENT DOCUMENTS

2017/0111264 A1* 4/2017 Shankarappa ........ H04L 45/245
2018/0019942 A1* 1/2018 Liang ...................... H04L 45/30
2018/0132159 A1* 5/2018 Strong .................... H04L 45/00

* cited by examiner

| L1 | L2 | drop | status L1, L2 |
|---|---|---|---|
| 0, 1, 2, 4 | 3, 5, 6, 7 | - | any |

Fig. 6a

| index | L1 | L2 | drop | status L1 | status L2 |
|---|---|---|---|---|---|
| A | 0, 1, 2, 4 | 3, 5, 6, 7 | - | 256-QAM 128-QAM | any |
| B | 0, 1, 2, 4 | 3, 5, 6, 7 | - | 64-QAM 32-QAM | any |
| C | 1, 2, 4 | 3, 5, 6, 7 | 0 | 16-QAM 4-QAM | any |
| D | - | 1, 2, 3, 5, 6, 7 | 0, 4 | down | any |
| E | 0, 1, 2, 3, 4, 5, 6, 7 | - | - | any | down |

Fig. 6b

TRAFFIC DISTRIBUTION OVER AGGREGATED RADIO LINKS

TECHNICAL FIELD

The present invention relates to the field of packet-based wireless communication networks. In particular, the present invention relates to a method for distributing packets of a data traffic over aggregated radio links.

BACKGROUND ART

In a packet-based wireless communication network, two network sites are typically connected by means of one or more packet-based radio links. At each site, a network node typically comprises an indoor unit (IDU), which is connected to a number of outdoor units (ODU), each ODU being configured to manage forwarding of packets over a respective radio link towards a further network site. Typically, at a network site, the IDU and the ODUs are connected by means of a cable, known as "IF cable" (wherein, as known, the acronym "IF" indicates "Intermediate Frequency"). The IF cable is configured to transport data traffic from the IDU to the ODUs, where they are converted into radio-frequency (RF) signals and transmitted over the radio links.

As known, the term link aggregation applies to methods of combining multiple parallel links connecting two network sites in order to increase the network throughput between the same sites, and to provide redundancy in case one of the individual links should fail. In this respect, it is known connecting a number N of ODUs to a single antenna (in a so-called "N+0" configuration), such that the ODUs carry separate signals over the aggregated links connecting two nodes to increase the network throughput.

In order to work properly and increase the throughput, the data traffic needs to be distributed over the aggregated links.

According to known implementations, link aggregation may be used in conjunction with a load balancing technique. Generically, load balancing refers to a method of distributing the data traffic over a number of links in order to balance the amount of traffic carried by the links to prevent overloads and failures. For distributing the data traffic over aggregated links, typically a hashing algorithm is executed, which determines which link is to be used for a given incoming unit of the data traffic (e.g. a frame or packet) on the basis of a subset of values carried within the data unit, such as for instance the source MAC address and the destination MAC address.

U.S. Pat. No. 8,264,959 discloses load balancing for layer-2 link aggregation implemented in a microwave radio system. It involves initial assignment of link aggregation keys (LAGKs) and reassignment of LAGKs when a load imbalance condition that merits action is discovered. Load conditions change dynamically and for this reason load balancing tends to also be dynamic. Load balancing is preferably performed when it is necessary. Thus an imbalance condition that triggers load balancing is preferably limited to conditions such as when there is frame drop, loss of synchronization or physical link capacity exceeded.

SUMMARY OF THE INVENTION

The inventors noticed that known implementations of the link aggregation method in conjunction with load balancing rely on the definition of a proprietary architecture for the IDU/ODU communication system and a proprietary communication channel between the IDU and the ODU. Typically, the IDU/ODU communication system is provided by a single vendor, as exemplarily described in U.S. Pat. No. 8,264,959.

Moreover, implementation of the load balancing technique may be computationally costly as, for instance, it requires continuously monitoring the conditions of the aggregated physical links and calculating updated traffic loads for the aggregated physical links each time the conditions vary, in order to keep the required balancing over the links.

In view of the above, the Applicant has tackled the problem of providing a method for distributing data traffic over aggregated radio links, which allows overcoming the drawbacks discussed above. In particular, the Applicant has tackled the problem of providing a method for distributing data traffic over aggregated radio links, which may be implemented in a communication system of a multi-vendor type, wherein the IDU and the ODUs are possibly provided by different vendors and are commercially available, so as to reduce costs, while allowing to also reduce the computational complexity. These and other objects are achieved by providing a method for distributing data traffic over aggregated radio links which is not based on load balancing but allows distributing the data traffic on the basis of an association between values of a priority parameter carried in the packets and the aggregated radio links.

According to a first aspect, the present invention provides a method for distributing packets of a data traffic over aggregated radio links connecting a node of a packet-switched wireless communication network to a further node of the packet-switched wireless communication network, the aggregated radio links comprising a first radio link and a second radio link, the method comprising, at an indoor unit of the node:

a) configuring at least one set of distribution rules indicating, for each of the first radio link and second radio link, an association between the radio link and a subset of values of a priority parameter carried within the packets; and b) upon reception of a packet of the data traffic, distributing the packet over the first radio link or the second radio link on the basis of the priority parameter value carried within the packet and the associations.

Preferably, the first radio link and the second radio link are operated over different frequency bands.

Preferably, the priority parameter is comprised in a layer 2 or layer 3 header of the packet. More preferably, the priority parameter is the class of service value of the packets.

Preferably, the at least one set of distribution rules comprises rules associating a respective subset of values of said priority parameter with each of the first radio link and the second radio link.

Preferably, each set of distribution rules is associated with a corresponding operating status of the aggregated radio links.

Preferably, the operating status of the aggregated radio links is indicative of an actual fading condition of the aggregated radio links and/or of an operating condition of input and output ports of the aggregated radio links.

Profitably, the at least one set of distribution rules comprises one or more rules indicating one or more values of the priority parameter of packets to be dropped.

Preferably, the method further comprises, at step a), storing the at least one set of distribution rules in a database.

According to embodiments of the present invention, step b) comprises distributing the packets on the basis of one single set of distribution rules based on nominal features of the aggregated radio links.

According to other embodiments of the present invention, step b) comprises distributing the packets on the basis of a number of different sets of distribution rules, wherein the method further comprises, before distributing, selecting one of the different sets of distribution rules on the basis of the operating status of the aggregated radio links. Preferably, the method further comprises, before selecting, determining a current status of the aggregated radio links on the basis of information indicative of the performance of the aggregated radio links.

According to a first aspect, the present invention provides a computer program product loadable in the memory of a computer and including software code portions for performing the steps of the method as set forth above, when the product is run on the computer.

According to a third aspect, the present invention provides an indoor unit for a node of a packet-switched wireless communication network, the node being connected to a further node of the packet-switched wireless communication network through aggregated radio links comprising a first radio link and a second radio link, the indoor unit comprising:
- a database configured to store at least one set of distribution rules indicating, for each of the first radio link and second radio link, an association between the radio link and a subset of values of a priority parameter carried within the packets; and
- a processing unit configured to, upon reception of a packet of the data traffic, distributing the packet over the first radio link or the second radio link on the basis of the priority parameter value carried within the packet and the associations.

According to embodiments of the present invention, the indoor unit is configured to store at least two different sets of distribution rules, and it further comprises:
- a first link status detection unit configured to determine a current status of the first radio link;
- a second link status detection unit configured to determine a current status of the second radio link; and
- a selection unit configured to select one set of distribution rules among the at least two different sets of distribution rules for distributing the packet over the first radio link or the second radio link, the selection being based on the determined current status of the first radio link and the determined current status of the second radio link.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
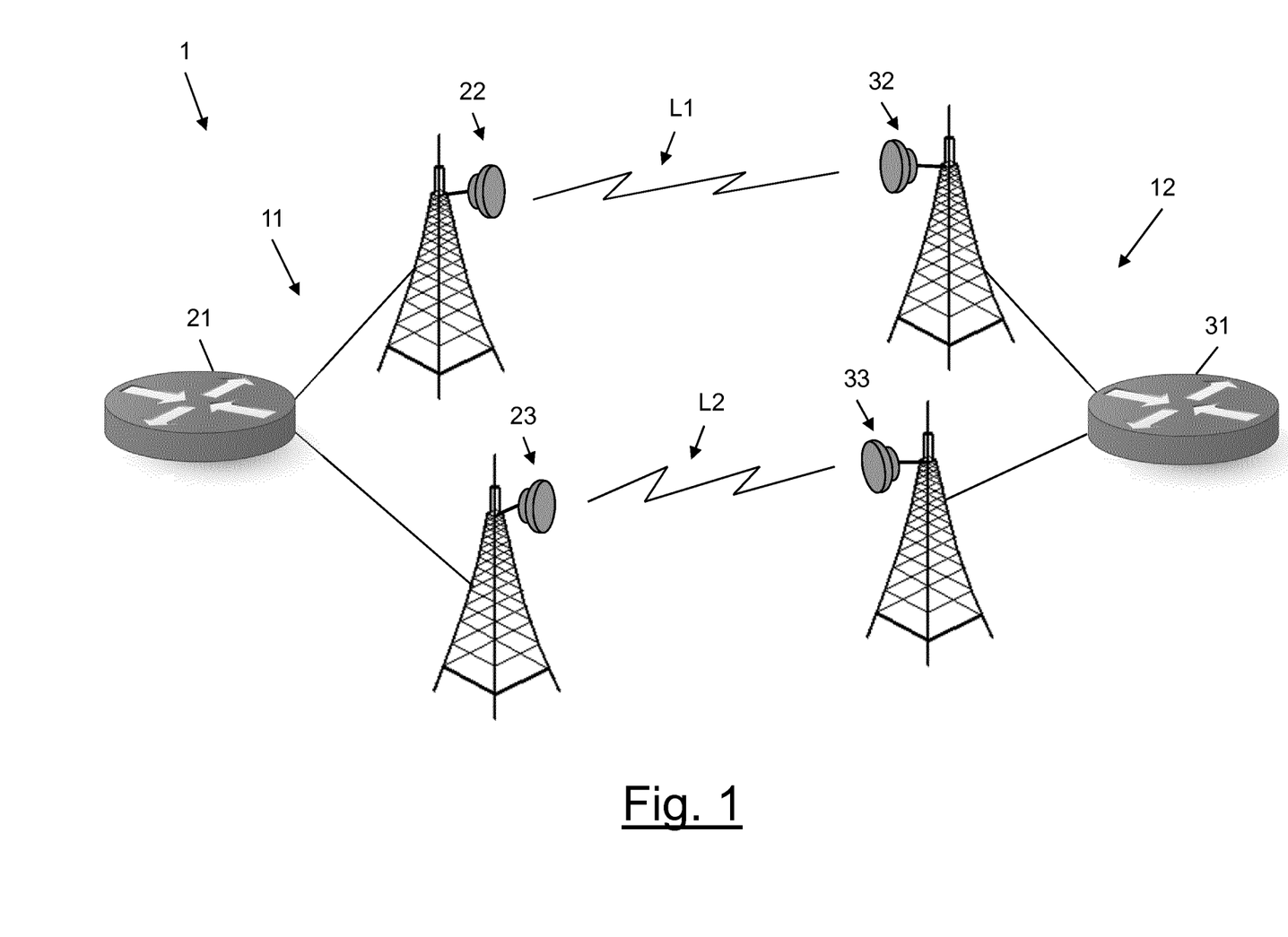
FIG. 1 schematically shows a communication system implementing the method according to embodiments of the present invention.

FIG. 1 schematically shows a communication system 1 of a wireless packet-based communication network comprising a first network node at a first site 11 and a second network node at a second site 12, and a number of aggregated radio links connecting the first network node and the second network node. For sake of example, in the communication system 1 of FIG. 1 the aggregated radio links comprise a first link L1 and a second link L2.

The first network node at the first site 11 comprises an IDU 21. Moreover, at the first site 11, one ODU per each radio link of the aggregated radio links connecting the first network node to the second network node is deployed. Therefore, in the communication system 1 of FIG. 1, the first site 11 comprises a first ODU 22 and a second ODU 23. The second network node at the second site 12 comprising an IDU 31. Moreover, the second site 12 comprises one ODU per each radio link of the aggregated radio links connecting the second node to the first node. Therefore, in the communication system 1 of FIG. 1, the second site 12 comprises a first ODU 32 and a second ODU 33.

The IDU 21 of the first node is preferably a router capable of receiving data traffic, in the form of packet flows, from a further network node and to distribute the packet flows over a number of output ports connected to the aggregated radio links (namely, in the exemplary system of FIG. 1, the first radio link L1 and the second radio link L2) according to the method of the present invention. The IDU 31 of the second node is preferably a router capable of receiving, via a number of input ports, the packet flows transmitted over the aggregated radio links and to merge said packet flows for forwarding the data traffic to an even further network node. The merging capabilities of the IDU 31 are not relevant to the preset invention and hence they will not be further described herein below.

According to the present invention, the radio links connecting the first network node and the second network node may be operated in different frequency bands and they may have different carrier frequency and/or different bandwidth and/or different capacity (or, throughput) and/or different channel width and/or different channel spacing and/or different polarization and/or different availability/reliability. According to the present invention, the first radio link L1 and the second radio link L2 of the aggregated radio links connecting the two network nodes have different features in terms of capacity (or, throughput) and availability/reliability. In particular, preferably, the first radio link L1 is a "high-capacity" radio link while the second radio link L2 is a "high-reliability" radio link.

Each radio link L1, L2 operates on a given radio frequency (RF) band. In the following description and in the claims, a radio link will be associated with the following features:

throughput, indicating a rate of data delivery over the radio link, measured in bits per second (bps);

distance, indicating a span length that can be reached with given availability (e.g. 99,995%);

carrier frequency;

channel width;

free space attenuation;

antenna gain;

modulation scheme.

The high-capacity radio link L1 is preferably a millimeter wave link. For instance, the first radio link L1 may have the following features:

throughput up to 5 Gbps;

distance up to 3 km;

carrier frequency higher than or equal to 42 GHz (typically 80 GHz);

channel width higher than or equal to 200 MHz;

high free space attenuation, for instance equal to about 143 dB for a length of about 4 km and 146 dB for a length of about 6 km;

antennas with gain up to 51 dB with diameters up to 60 cm;

modulation scheme up to 256-QAM.

In a medium distance range (for example 6 km), the high-capacity radio link L1 provides a capacity in the range of Gbps with limited availability in case of fading due to, for instance, bad weather conditions.

The high-reliability radio link L2 is preferably a microwave link. For instance, the second radio link L2 may have the following features:

throughput up to 500 Mbps;

distance up to 10 km;

carrier frequency less than or equal to 42 GHz;

channel width less than or equal to 56 MHz;

low free space attenuation, for instance equal to about 130 dB for a length of about 4 km and 133 dB for a length of about 6 km;

antennas with gain up to 38 dB with diameters up to 60 cm;

modulation scheme up to 4096-QAM.

In a medium distance range (for example 6 km), the high-reliability radio link L2 provides a capacity in the range of hundreds of Mbps with a good availability profile, even in case of fading due to, for instance, bad weather conditions.

Combined usage of the links described above allows having aggregated radio links with high capacity and high reliability in a wide range of distances (namely, in a range of distances between the values indicated above for the high-capacity radio link L1 and the high-reliability radio link L2) and optimizing the link deployment as compared to traditional implementations at the same conditions of capacity, reliability and distance. Indeed, usage of the links described above allows reducing the hardware (thanks to the presence of the high-capacity link), reducing the size of the antennas, reducing the cost of channel licenses (thanks to using millimetre wave links), and it is also advantageous due to the availability of unused millimeter wave channels.

Moreover, it is assumed that Adaptive Coding and Modulation (ACM) is applied over each radio link L1, L2, which, as known, provides for matching of the modulation, coding and other signal and protocol parameters to the conditions of the radio link (e.g. fading due to bad weather conditions). It is further assumed, for sake of example, that the modulation scheme over the high-capacity radio link L1 may be selected from: 256-QAM, 128-QAM, 64-QAM, 32-QAM, 16-QAM, 4-QAM. Lower order modulation schemes (16-QAM, 4-QAM) are more robust and can tolerate higher levels of interference but have lower transmission bit rate. Higher order modulation schemes (256-QAM, 128-QAM) have higher bit rate but are more prone to errors due to interference. Even higher order modulation schemes (4096-QAM to 1024-QAM) may be adopted over the high-reliability radio link L2, as already cited above.

The method for distributing the packets over the aggregated radio links according to two different embodiments of the present invention will be described in detail herein below.

The method for distributing the packets according to the present invention is based on a parameter carried within the packet and indicating a priority of the packet. The parameter (which will be indicated in the following as "priority parameter") is carried within the packet, in particular within an header of the packet, either a layer 2 header, a layer 3 header or another header of the packet at any layer of the ISO/OSI protocol stack.

The priority parameter is a fixed-length parameter that may take a value within a given set of discrete integer values. For instance, the priority parameter may be a 3-bit parameter that may take a value within the set $\{0, 1, 2, 3, 4, 5, 6, 7\}$.

The priority parameter may be one of the following:

the class of service (CoS) of the packet, comprised within the Ethernet packet header (layer 2). It is a 3-bit field which specifies a priority value between 0 and 7;

the IP precedence of the packet, comprised within the IP packet header (layer 3). It is a 3-bit field in the ToS (Type of Service) byte of the IP header, which may take a value comprised between 0 and 7;

the DSCP (Differentiated Services codepoint) of the packet, comprised within the IP packet header (layer 3). The DSCP parameter comprises 6 bits in the DS (Differentiated Services) field. The 3 most significant bits may be used to specify a priority value between 0 and 7;

the experimental (EXP) field or traffic class (TC) field of the packet, comprised within the MPLS packet header (layer 2.5). The EXP or TC field comprises 3 bits and may take a value comprised between 0 and 7.

An example of classification of the data traffic according to the CoS parameter is given below. The data traffic to be sent over the aggregated radio links may be classified also in terms of committed information rate (CIR) and peak information rate (PIR), whose value is expressed in Mbps, according to the following exemplary table:

TABLE 1

| Traffic type | CoS | CIR | PIR |
|---|---|---|---|
| Network control | 6, 7 | 2 | 2 |
| IP clock, voice | 5 | 48 | 48 |
| Gaming, real time services, video | 3 | 130 | 130 |
| SOHO (Small Office/Home Office) | 2 | 10 | 10 |
| | 4 | 0 | 390 |
| Residential (browsing) | 1 | 10 | 100 |
| | 0 | 0 | 1600 |

According to the method of the present invention, each packet received by the IDU is preferably processed according to a distribution algorithm. The distribution algorithm returns an indication of the output port to which the packet is to be sent for transmission over one radio link of the aggregated radio links, namely, according to the example described above, the first radio link L1 or the second radio link L2. The distribution algorithm may also return an indication that the packet is to be dropped.

According to the present invention, the distribution algorithm preferably executes a set of distribution rules. The set of distribution rules preferably comprises a number of rules, wherein each rule is associating a respective subset of values of the packet priority parameter with one radio link L1, L2, of the aggregated radio links. Each subset may comprise one or more values of the packet priority parameter or it may be empty. An empty subset indicates that no value of the priority parameter is associated with the radio link. The set of distribution rules may also comprise one or more further rules indicating one or more values of the packet priority parameter of packets to be dropped.

At the IDU, at least one set of distribution rules is preferably configured, each set being associated with a respective operating status of the aggregated radio links of the communication system 1.

In the following description and in the claims, the expression "operating status" of the aggregated radio links of the communication system 1 indicates the current statuses of all the radio links of the communication system 1. This status is indicative of the actual fading conditions of the radio links L1, L2 (which depend on, mainly, the weather conditions) and/or the operating conditions of the input and output (physical) ports of the radio links L1, L2. In particular, the operating status of the aggregated radio links may be determined by a given condition of fading along the radio links and/or an hardware fault (namely, a port failure). In case of hardware fault, the involved radio link is unavailable. The radio link may be unavailable also in case of critical fading conditions. Moreover, an operating status of the aggregated radio links may indicate a condition of moderate fading over all the radio links of the communication system 1 when they are experiencing a moderate fading condition associated with light rain, and a condition of deep fading when all the radio links of the communication system 1 are experiencing a deep fading condition associated with heavy rain.

In the conditions described herein above, the current status of a radio link may be associated with any of the modulation scheme, the coding scheme, and the other signal and protocol parameters related to the data transmission over the radio links. For instance, the current status of the radio link may be associated with the one or more modulation schemes that result from the application of the ACM technique in the considered fading condition. In these cases, each set of distribution rules may be associated, for each radio link, with a respective range of modulation schemes, each range of modulation schemes representing the given operating status of the aggregated radio links of the communication system 1. It can be assumed that fading affects mainly the first (high-capacity) radio link L1, so that: in case of no fading conditions the modulation schemes that are adopted over the first radio link L1 are 256-QAM or 128-QAM; in case of moderate fading implementation of the ACM technique may provide for varying the modulation scheme to the 64-QAM or 32-QAM; in case of deep fading, the modulation scheme may change from any of 256-QAM to 32-QAM down to 16-QAM or 4-QAM; in case of critical fading, the first radio link L1 is unavailable. On the other side, it may be assumed that, in any condition, the modulation scheme adopted over the second (high-reliability) radio link L2 may be an higher order modulation scheme (4096-QAM to 1024-QAM) because of the higher availability of this radio link.

As already cited above, the operating status of the aggregated radio links may indicate that the first radio link L1 is unavailable due to for, instance, an hardware fault such as a port failure. Analogously, the operating status of the aggregated radio links may indicate that the second radio link L2 is unavailable due to for, instance, an hardware fault such as a port failure. In these cases, the set of distribution rules may be associated, for the unavailable radio link, with an indication that the relevant radio link is down.

Figure 6A:
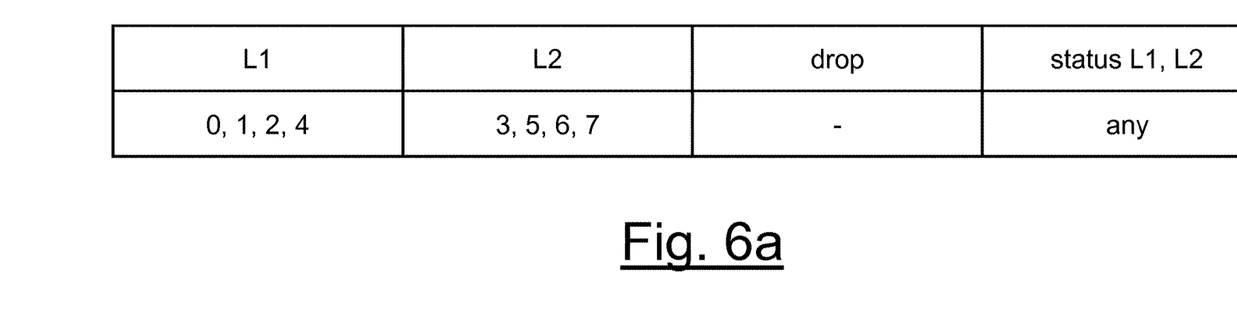
FIGS. 6a and 6b show examples of a first distribution table and a second distribution table used to implement the method according to, respectively, the first embodiment and the second embodiment of the present invention.
Figure 6B:
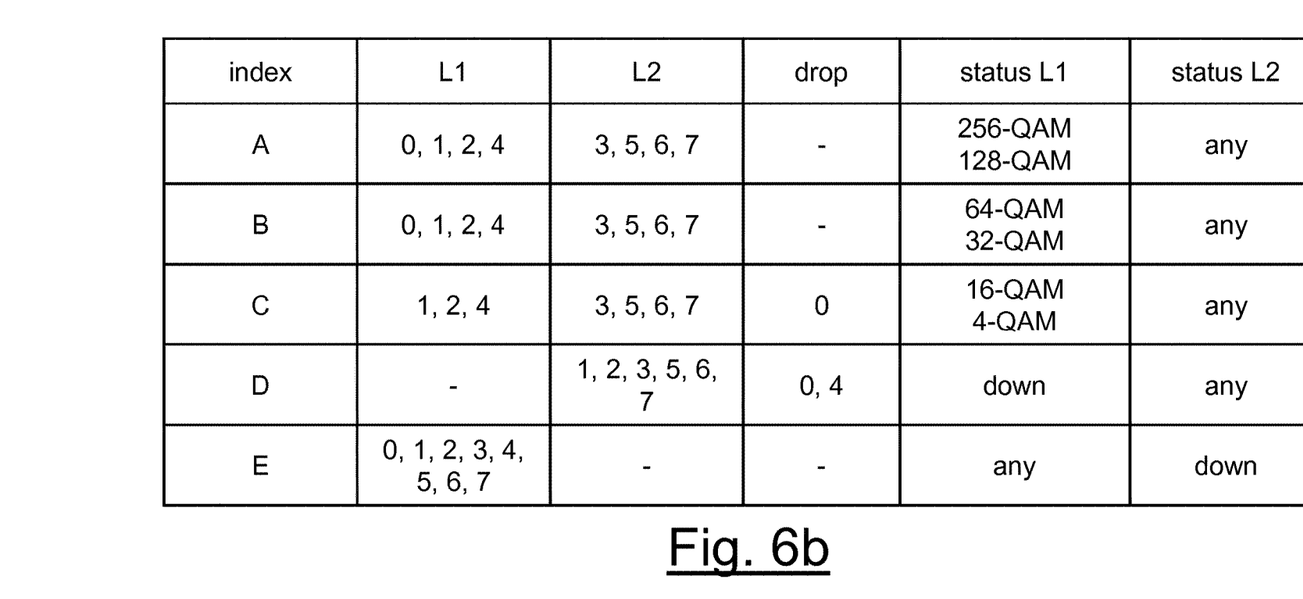

The at least one set of distribution rules is preferably stored at the IDU in a database. The at least one set of distribution rules may be represented, for instance, in the form of a distribution table (exemplary distribution tables are shown in FIGS. 6a and 6b, which will be described in detail later). The distribution table representing the at least one set of distribution rules may be organized in rows, each row being associated with a respective set of distribution rules. Each row preferably comprises, in respective columns, the subsets of values of the packet priority parameter associated with the individual radio links of the aggregated radio links, and the subset of values of the packet priority parameter associated with packets to be dropped. Moreover, each row may comprise information indicative of the operating status of the aggregated radio links of the communication system 1 with which the relevant set of distribution rules is associated. In particular, according to the example above, the distribution table comprises: the subset of values of the packet priority parameter associated with the first radio link L1 (the high-capacity radio link), the subset of values of the packet priority parameter associated with the second radio link L2 (the high-reliability radio link) and the subset of values of the packet priority parameter of packets to be dropped. The information indicative of the operating status of the aggregated radio links may comprise an alphanumeric index (e.g. A, B, C, D and so on) and/or a description of the statuses of the radio links, which may comprise, for each radio link, an indication of the range of modulation schemes adopted over the radio link, or an indication that the radio link is down. Each alphanumeric index and each description is uniquely associated with a respective operating status of the aggregated radio links of the communication system 1.

According to the first embodiment of the present invention, the IDU is configured with a single (static) set of distribution rules to be executed by the distribution algorithm. The word "static" indicates that, according to the first embodiment of the present invention, the set of distribution rules is firstly determined before the communication system 1 starts operating and it is determined by the network operator on the basis of the nominal features of the radio links, which may be as those described above with reference to the exemplary high-capacity link and the high-reliability link.

According to the second embodiment of the present invention, the IDU is configured with a number N of different sets of distribution rules (the number N of sets being an integer number higher than 1), wherein, within each set, each rule may associate a respective subset of values of the packet priority parameter with one radio link L1, L2 of the aggregated radio links, or it may indicate one or more values of the packet priority parameter of packets to be dropped. Each subset may comprise one or more values of the packet priority parameter or it may be empty. Each set within the number N of sets of distribution rules preferably corresponds to a pre-defined operating status of the aggregated radio links of the communication system 1. Moreover, according to the second embodiment of the present invention, at the IDU, the set of distribution rules to be executed by the distribution algorithm, among the number N of different sets of distribution rules, is selected on the basis of information indicative of the current statuses of the radio links, as it will be described in detail herein after.

Figure 2:
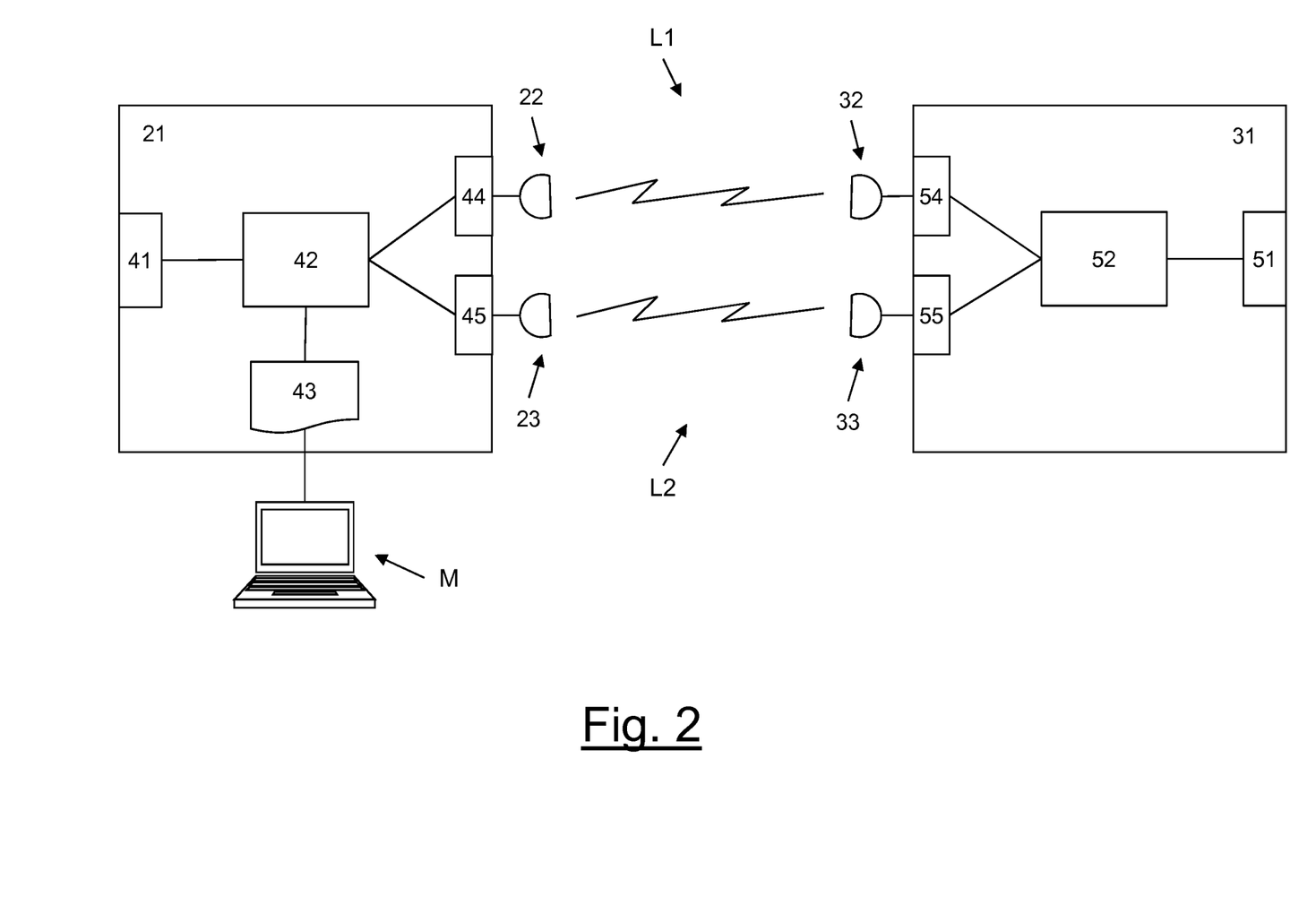
FIG. 2 shows block schemes of the communication system of FIG. 1 according to a first embodiment of the present invention.

FIG. 2 shows the communication system 1 of FIG. 1 with block schemes of the IDUs 21, 31 of both the first node and the second node according to a first embodiment of the present invention.

According to this first embodiment, the IDU 21 of the first node preferably comprises an ingress interface 41, a processing unit 42, a database 43, a first output port 44 and a second output port 45. The ingress interface 41, the processing unit 42, the first output port 44 and the second output port 45 are connected in cascade. The first output port 44 and the second output port 45 are connected, respectively, to the first ODU 22 and to the second ODU 23. The first and second output ports 44, 45 may be Ethernet ports, each connected to the respective ODU 22, 23 by means of an Ethernet cable. The processing unit 42 is connected to the database 43, which is in turn connected to a management unit M. The management unit M may be used by a network operator to access the management plane of the IDU 21. The management unit M is preferably external to the IDU 21, and may be remotely connected to the IDU 21 by a wired or wireless connection.

The ODUs 22, 23 may be commercially available units and hence they have known architectures. For this reason, they will not be further described throughout this description.

The IDU 31 of the second node preferably comprises a first input port 54, a second input port 55, a processing unit 52 and an egress interface 51. The first input port 54, the second input port 55, the processing unit 52 and the egress interface 51 are preferably connected in cascade. The first input port 54 and the second input port 55 are connected to, respectively, the first ODU 32 and to the second ODU 33.

The ingress interface 41 of the IDU 21 is preferably configured to receive the packets from the further network node and to forward the packets to the processing unit 42. The processing unit 42 is configured to distribute the packets over the first output port 44, for transmission over the first radio link L1, and the second output port 45, for transmission over the second radio link L2.

According to this first embodiment, the static set of distribution rules is preferably stored in the database 43. As already mentioned above, the distribution rules may be represented in the form of a distribution table. The distribution table representing the static set of distribution rules may be organized in a single row comprising, in respective columns, the subsets of values of the packet priority parameter associated with the individual radio links of the aggregated radio links, and the subset of values of the packet priority parameter of packets to be dropped.

An exemplary distribution table representing a static set of distribution rules is shown in FIG. 6a. As mentioned above, it is assumed that the packet priority parameter of a packet may take a discrete integer value within the set {0, 1, 2, 3, 4, 5, 6, 7}. The distribution table of FIG. 6a comprises one row and four columns. The first column contains the subset of values of the packet priority parameter associated with the first radio link L1, namely {0, 1, 2, 4}. The second column contains the subset of values of the packet priority parameter associated with the second radio link L2, namely {3, 5, 6, 7}. The third column contains the subset of values of the packet priority parameter of packets to be dropped, which, in this case, is null. The distribution table of FIG. 6a further comprises a fourth column indicating that packets shall be distributed as indicated in the first and second columns in "any" operating status of the aggregated radio links of the communication system 1.

The set of distribution rules is preferably configured by a network operator at the management plane of the IDU 21, possibly through the management unit M. This may be performed during a node commissioning phase.

Figure 3:
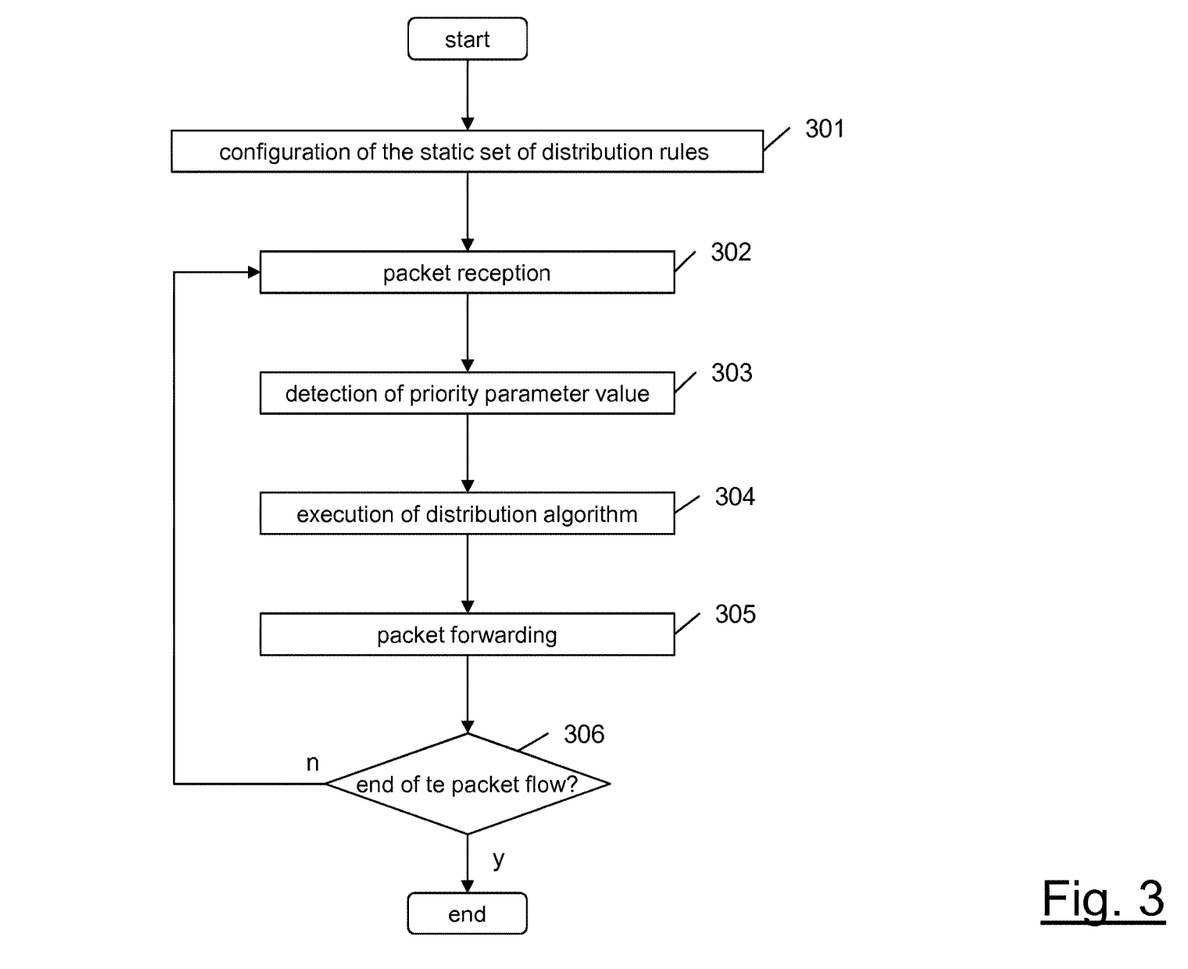
FIG. 3 is a flowchart illustrating the steps of the method according to the first embodiment of the present invention.

FIG. 3 shows a flowchart illustrating the steps of the method according to the first embodiment of the present invention.

Step 301 comprises configuring the static set of distribution rules in the IDU 21. In particular, during step 301, the network operator configures the static set of distribution rules in the IDU at the management plane, and the static set of distribution rules is stored in the database 43. Step 301 is preferably performed upon commissioning of the network node, in particular upon commissioning of the IDU 21.

During the operation of the node, the IDU 21 receives the packets of a given packet flow via its ingress interface 41 (step 302). Each packet is then forwarded to the processing unit 42, which performs steps 303-305. At step 303, the processing unit 42 preferably retrieves from the packet the value of the priority parameter carried within the packet. Then, preferably, the processing unit 42 recover the static distribution rules from the database 43 and executes the distribution algorithm (step 304). In particular, the distribution algorithm, on the basis of the value of the packet priority parameter, executes the relevant distribution rule and provides an indication of the output port towards which the packet has to be forwarded for being transmitted over the corresponding radio link. Then, on the basis of the outcome of the distribution algorithm, the processing unit 42 preferably forwards the packet towards the relevant output port (step 305).

For instance, according to the set of rules illustrated in the distribution table of FIG. 6a, if the ingress interface 41 receives a packet carrying a CoS value equal to 3, the distribution algorithm provides for forwarding the packet towards the second output port 45, which is connected to the second (high-reliability) radio link L2. On the other hand, when the ingress interface 41 receives a packet carrying a CoS value equal to 1, the distribution algorithm provides for forwarding the packet towards the first output port 44, which is connected to the first (high-capacity) radio link L1.

As already mentioned above, steps 302-306 are preferably repeated for each packet received by the IDU 21 via its ingress interface 41, until the end of the considered packet flow (step 306).

The description above has been provided with reference to a given direction of packet flows (i.e. from the first site 11 to the second site 12), for sake of non limiting example. Indeed, according to the present invention, the method described above may be implemented locally in both the IDUs of the considered communication system. In this case, both the IDUs have similar components.

According to the first embodiment of the present invention, the static set of distribution rules may be changed at any time during operation of the communication system 1. A change in the static set of distribution rules may be triggered by, for instance, the need to provision a new service requiring transmission of an additional packet flow within the considered communication network. In this case, the network operator preferably reconfigures the set of distribution rules at the management plane of the IDU 21, possibly though the management unit M. Once the modified set of distribution rules is configured in the IDU 21, packets are forwarded to the output ports 44, 45 of the IDU 21 in the same manner already described above with reference to steps 302-306 of the flowchart of FIG. 3.

Figure 4:
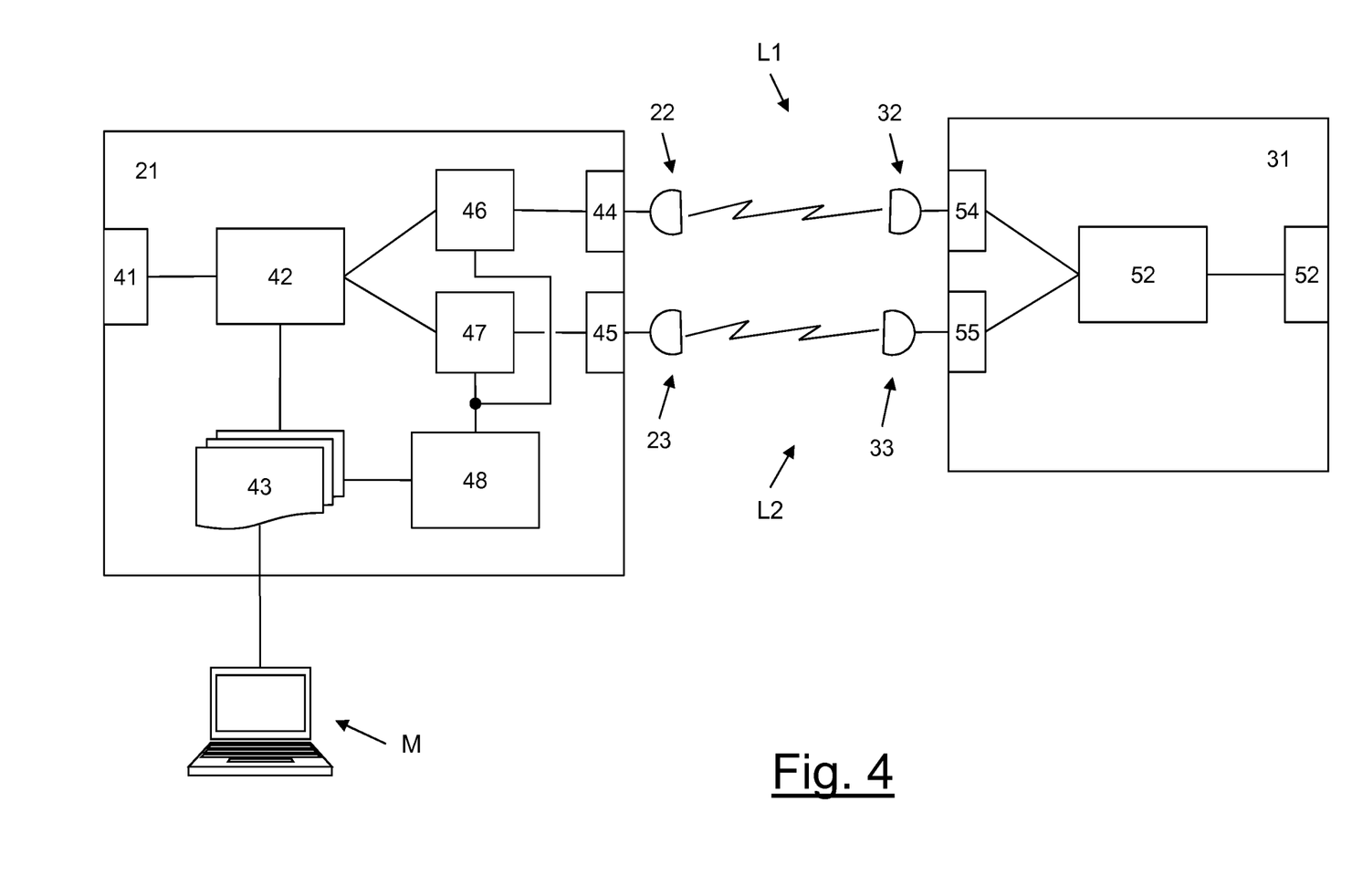
FIG. 4 shows block schemes of the communication system of FIG. 1 according to a second embodiment of the present invention.

FIG. 4 shows the communication system 1 of FIG. 1 with block schemes of the IDUs 21, 31 of both the first node and the second node according to a second embodiment of the present invention. It is to be noticed that, for sake of simplicity, the components of the communication system 1 which are common to the first embodiment and the second embodiment will be referred to with the same reference numbers or symbols.

According to this second embodiment, the IDU 21 of the first node preferably comprises an ingress interface 41, a processing unit 42, a database 43, a first output port 44 and a second output port 45, as already described above with reference to the first embodiment of the present invention. The IDU 21, according to this second embodiment, further comprises a first link status detection unit 46, interposed between the processing unit 42 and the first output port 44, a second link status detection unit 47, interposed between the processing unit 42 and the second output port 45, and a selection unit 48, connected to both the first and second link status detection units 46, 47 and to the database 43.

The first link status detection unit 46 and the second link status detection unit 47 are preferably configured to determine a current status of the first and second radio link L1, L2, respectively, and provide corresponding radio link status information to the selection unit 48.

As already mentioned above, the current status of the radio link is related to the actual fading conditions of the radio link (which depend on, mainly, the weather conditions) and/or the operating conditions of the input and output (physical) ports of the radio link. The current status of the radio link may be determined by a given condition of fading along the radio link: for instance, a radio link may experience a moderate fading condition in case of light rain, and a deep fading condition in case of heavy rain. Assuming, as already described above, that the ACM technique is implemented for data transmission over the radio links, the current status of the radio link may be associated with the modulation scheme(s) that are adopted over the link in the current fading conditions. Moreover, the current status of the radio link may be determined by a hardware failure at an input or output port, which leads to the unavailability of the radio link. Also critical fading conditions may lead to the radio link unavailability.

Determination of the current status of the radio link may be performed on the basis of information indicative of the radio link performance, which may comprise one or more of the following information:

performance monitoring information indicating the current available bandwidth over the radio link L1, L2 or, equivalently, the current modulation scheme adopted over the radio link L1, L2, which may be provided by the ODU 22, 23 to the IDU 21, according to, for instance, mechanisms based on extensions of the known ITU-T Y.1731 protocol, such as the method described in US 2014/0286173 A1;

physical port alarms indicating faults that render the radio link unusable;

performance monitoring information available at the IDU 21 through implementation of a known SDN (Software-Defined Networking) controller.

The selection unit 48 is preferably configured to process the radio link status information received from the first link status detection unit 46 and from the second link status detection unit 47, to determine a corresponding operating status of the aggregated radio links of the communication system 1 and to select the set of distribution rules associated with the determined operating status of the aggregated radio links among the number N of sets of distribution rules configured in the IDU 21. The selected set of distribution rules is then provided by the selection unit 48 to the processing unit 42 in order to be executed by the distribution algorithm.

The number N of sets of distribution rules is preferably stored in the database 43. As already mentioned above, the number N of sets of distribution rules may be represented in the form of a distribution table. The distribution table representing the number N of sets of distribution rules may be organized in a number N of row, each row being associated with a given operating status of the aggregated radio links of the communication system 1. Each row preferably comprises, in respective columns, the subsets of values of the packet priority parameter associated with the individual radio links of the aggregated radio links in correspondence of the given operating status of the aggregated radio links. In particular, according to the example above, the distribution table comprises: the subset of values of the packet priority parameter associated with the first radio link L1, the subset of values of the packet priority parameter associated with the second radio link L2 and the subset of values of the packet priority parameter of packets to be dropped and the information indicative of the corresponding operating status of the aggregated radio links, this information comprising an alphanumeric index (e.g. A, B, C, D, E) and/or a description of the statuses of the radio links, which may comprise, for each radio link, an indication of the range of modulation schemes adopted over each radio link or an indication that the radio link is down. Each alphanumeric index and each description is preferably associated with a respective operating status of the aggregated radio links of the communication system 1. Further, information indicative of the corresponding operating status of the aggregated radio links of the communication system 1 may comprise data indicating the available bandwidth over the aggregated radio links, which may be determined by the first link status detection unit 46 and the second link status detection unit 47.

An exemplary distribution table representing a number of different sets of distribution rules is shown in FIG. 6b. As mentioned above, it is assumed that the packet priority parameter of a packet may take a discrete integer value within the set {0, 1, 2, 3, 4, 5, 6, 7}. The distribution table of FIG. 6b comprises five rows and five columns. The first column contains the index indicating a corresponding operating status of the aggregated radio links of the communication system 1. The second column comprises the subset of values of the packet priority parameter associated with the first radio link L1. The third column contains the subset of values of the packet priority parameter associated with the second radio link L2, namely. The fourth column contains the subset of values of the packet priority parameter of packets to be dropped. The fifth column and the sixth column contain the description of the current statuses of the radio links, which is represented, for each radio link, by the range of modulation schemes adopted or by an indication that the radio link is down. According to the exemplary table of FIG. 6b:

index A is associated with an operating status of zero fading, according to which over the first radio link L1 the 256-QAM or 128-QAM modulation schemes may be used, and over the second radio link L2 any modulation scheme may be used, up to 4096-QAM (which corresponds to a nominal operating status of the communication system 1);

index B is associated with an operating status of moderate fading, according to which over the first radio link L1 the 64-QAM or 32-QAM modulation schemes may be used, and over the second radio link L2 any modulation scheme may be used up to 4096-QAM;

index C is associated with an operating status of deep fading, according to which over the first radio link L1 the 16-QAM or 4-QAM modulation schemes may be used, and over the second radio link L2 any modulation scheme may be used up to 4096-QAM;

index D is associated with an operating status wherein link L1 is down (due to for instance critical fading conditions and/or hardware fault); and index E is associated with an operating status wherein link L2 is down (due to for instance critical fading conditions and/or hardware fault).

Depending on the operating status of the aggregated radio links of the communication system 1, the bandwidth availability over the first radio link L1 and the second radio link L2 changes. For sake of example, the nominal available bandwidths over the first radio link L1 and the second radio link L2 may be 1600 Mbps and 200 Mbps, respectively. In case of a deep fading condition, the available bandwidth over the aggregated radio links is reduced with respect to the nominal value mentioned above. In particular, the available bandwidth over the high-capacity radio link L1 reduces to, for instance, 400 Mbps, while the available bandwidth over the high-reliability radio link L2 remains nearly equal to the nominal value of 200 Mpbs, as the link is inherently more robust to bad weather conditions. In this case, the operating status associated with index C is selected, and the relevant set of distribution rules provides for forwarding packets with values in the subset {1, 2, 4} to the first radio link L1, for forwarding packets with values in the subset {3, 5, 6, 7} to the second radio link L2 and for dropping packets whose priority parameters is equal to 0. This selection advantageously allows exploiting in a very efficient manner the available bandwidth over the radio links.

The number N of sets of distribution rules are preferably configured by a network operator at the management plane of the IDU 21, possibly though the management unit M. This may be performed during a node commissioning phase.

Figure 5:
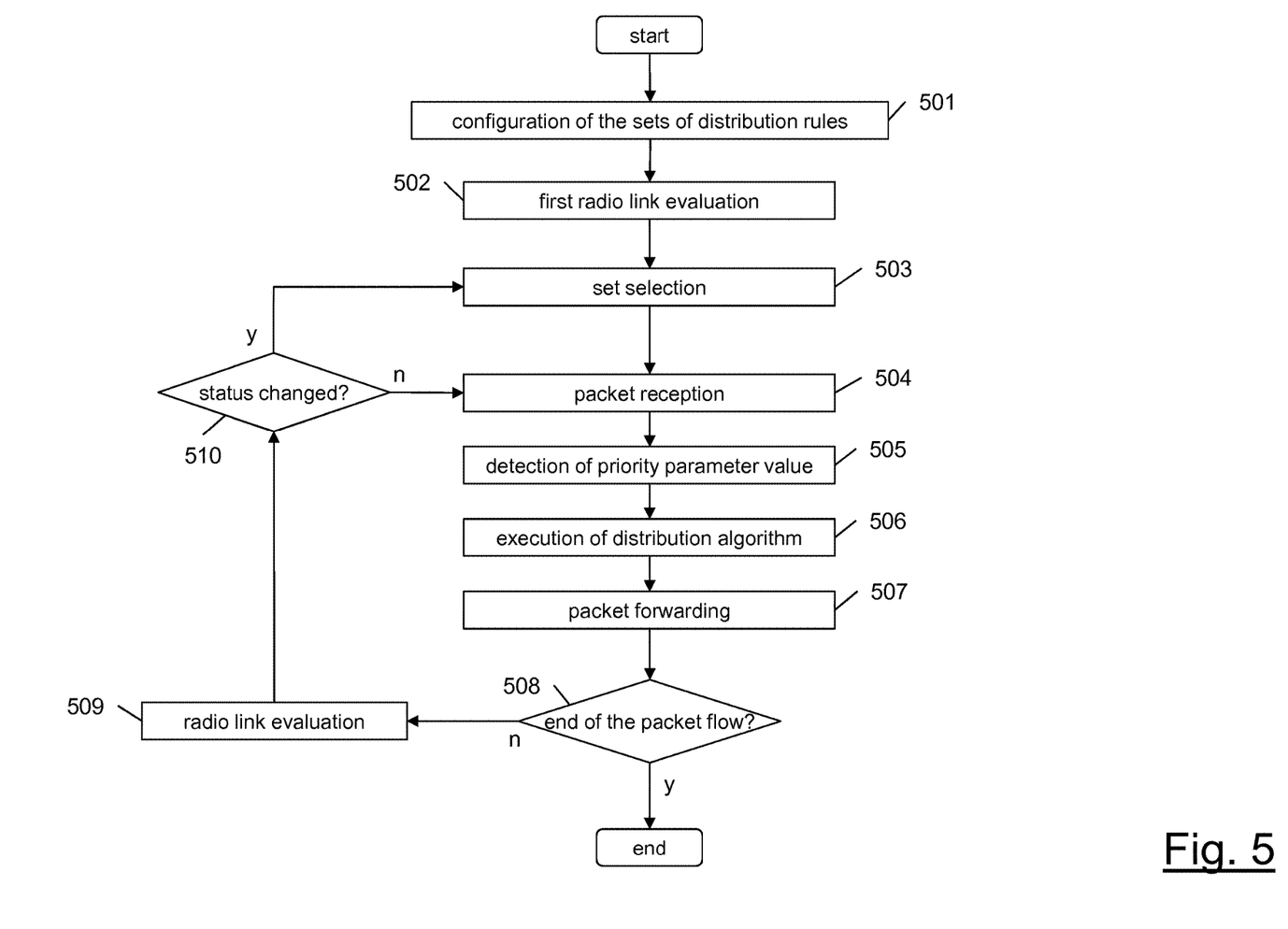
FIG. 5 is a flowchart illustrating the steps of the method according to the second embodiment of the present invention.

FIG. 5 shows a flowchart illustrating the steps of the method according to the second embodiment of the present invention.

Step 501 comprises configuring the number N of sets of distribution rules in the IDU 21. In particular, during step 501, the network operator configures the number N of sets of distribution rules in the IDU at the management plane, and the sets of distribution rules are stored in the database 43. Step 501 is preferably performed upon commissioning of the network node, in particular upon commissioning of the IDU 21.

During the operation of the node, the operating status of the aggregated radio links of the communication system 1 is preferably evaluated by the first link status detection unit 46 and the second link status detection unit 47 in cooperation with the selection unit 48. In particular, the first link status detection unit 46 detects information indicative of the first radio link performance, while the second link status detection unit 47 detects information indicative of the second radio link performance, according to the mechanisms already cited above. For instance, the first link status detection unit 46 gathers from the ODU 22 the information indicative of the current available bandwidth over the first radio link L1 or receives a port alarm, as already cited above. Similarly, the second link status detection unit 47 gathers from the ODU 23 the information indicative of the current available bandwidth over the second radio link L2 or receives a port alarm. Each of the first link status detection unit 46 and the second link status detection unit 47 uses the information indicative of the radio link performance to determine a current status of, respectively, the first radio link L1 and the second radio link L2, which may be stored in a register (not shown in the drawings).

In order to determine the operating status of the aggregated radio links of the communication system 1 and select a corresponding set of distribution rules, the selection unit 48 preferably retrieves the current status of the first radio link L1 and the current status the second radio link L2 as provided by the first link status detection unit 46 and the second link status detection unit 47. This operation may be performed according to a polling procedure or upon generation of an interrupt. Retrieving may comprise, for instance, interrogating the register mentioned above, which is written by the first link status detection unit 46 and the second link status detection unit 47.

A first evaluation of the operating status of the aggregated radio links of the communication system 1 and a first selection of the appropriate set of distribution rules is preferably performed upon commissioning of the first network node. For instance, the selection unit 48 may determine that the aggregated radio links are in their nominal operating status, and it preferably selects the set of distribution rules associated with this nominal operating status.

Then, each time a change is detected in the operating status of the aggregated radio links of the communication system 1, the selection unit 48 preferably selects a different set of distribution rules among the number N of sets that are stored in the database 43, as it will be described herein after.

Referring back to the flowchart of FIG. 5, the first evaluation about the operating status of the aggregated radio links of the communication system 1 is illustrated by steps 502 while the selection of the set of distribution rules is illustrated by step 503. During the normal operation of the communication system 1, the IDU 21 performs steps 504 to 507 for each packet of a considered packet flow. In particular, at step 504, the IDU 21 receives a packet via its ingress interface 41. The packet is then forwarded to the processing unit 42, which performs steps 505-508. At step 505, the processing unit 42 preferably retrieves from the packet the value of the priority parameter carried within the packet. Then, preferably, the processing unit 42 recover from the database 43 the distribution rules of the set of distribution rules that has been selected by the selection unit 48. Based on the distribution rules, the processing unit 42 preferably executes the distribution algorithm (step 506). In particular, the distribution algorithm, on the basis of the value of the packet priority parameter, applies the relevant distribution rule and provides an indication on the output port towards which the packet has to be forwarded for being transmitted over the corresponding radio link. Then, on the basis of the outcome of the distribution algorithm, the processing unit 42 preferably forwards the packet towards the relevant output port (step 507).

At subsequent step 508, a check is made as to whether the packet flow is terminated. In the negative, an evaluation is made about the current operating status of the aggregated radio links of the communication system 1 (step 509). The evaluation is performed by the selection unit 48 retrieving the current radio link statuses as provided by the first link status detection unit 46 and the second link status detection unit 47, as already described above. Then a check is made as to whether the operating status of the aggregated radio links of the communication system 1 has changed (step 510). If the current operating status of the aggregated radio links of the communication system 1, as indicated by the selection unit 48, changed, the selection unit 48 preferably repeats step 503 and selects a different set of distribution rules, namely the set associated with the new operating status of the aggregated radio links of the communication system 1. At this point, steps 504-508 are preferably repeated. If the current operating status of the aggregated radio links of the communication system 1, as indicated by the selection unit 48, has not changed, steps 504-508 are preferably repeated for processing the next packet received by the IDU 21 by using the same set of distribution rules used for the previous packet.

For instance, according to the sets of distribution rules illustrated in the distribution table of FIG. 6b, in a deep fading condition (corresponding to the operating status labeled with the index C in the distribution table of FIG. 6b), if the ingress interface 41 receives a packet carrying a CoS value equal to 3, the distribution algorithm provides for forwarding the packet towards the second output port 45, which is connected to the second (high-reliability) radio link L2. On the other hand, when the ingress interface 41 receives a packet carrying a CoS value equal to 1, the distribution algorithm provides for forwarding the packet towards the first output port 44, which is connected to the first (high-capacity) radio link L1. In this condition, packets with a Cos value equal to 0 are dropped. If the operating status of the aggregated radio links of the communication system 1 changes due to an hardware failure which causes the first radio link L1 to go down (corresponding to the operating status labeled with the index D in the distribution table of FIG. 6b), a subsequent packet carrying CoS value equal to 1 is switched to the second radio link L2. In this conditions packets carrying a Cos value equal to 0 or 4 are dropped.

As already mentioned above, steps 503-508 are preferably repeated for each packet received by the IDU 21 via its ingress interface 41, until the end of the considered packet flow.

The description above has been provided with reference to a given direction of packet flows (from the first site 11 to the second site 12), for sake of non limiting example. Indeed, according to the present invention, the method described above may be implemented locally in both the IDUs of the considered communication system. In this case, both the IDUs have similar components.

According to the second embodiment of the present invention, each set of distribution rules within the umber N of sets configured in the IDU 21 may be changed at any time during operation of the communication system 1. A change in a set of distribution rules may be triggered by, for instance, the need to provision a new service requiring transmission of an additional packet flow within the considered communication network. In this case, the network operator preferably reconfigures the modified set of distribution rules at the management plane of the IDU 21, possibly though the management unit M. Once the modified set of distribution rules is configured in the IDU 21, packets are forwarded to the output ports of the IDU 21 in the same manner already described above with reference to the flowchart of FIG. 5.

In the following description, an exemplary implementation of the method according to the present invention will be provided.

The considered exemplary implementation comprises a communication system with two aggregated radio links 8 km long. Antennas of size equal to 60 cm may be used. The first radio link is a high-capacity millimeter wave radio link with carrier frequency equal to 80 GHz, channel width equal to 250 MHz and transmit power of 14 dBm. The second radio link is a high-reliability microwave link with carrier frequency equal to 10 GHz, channel width equal to 28 MHz and transmit power of 14 dBm.

The data traffic to be sent over the aggregated radio links may be classified by using the Cos value of the packet header, as illustrated in Table 1.

According to the first embodiment of the present invention, the data traffic may be distributed over the first radio link and the second radio link on the basis of the set of distribution rules illustrated in the distribution table of FIG. 6a. As it can be noticed, the low priority data traffic (namely the packets having a CoS vale equal to 0, 1, 2, or 4) is forwarded by the processing unit to the high-capacity link regardless of the link status, while data traffic with high priority (i.e. packets with CoS values equal to 3, 5, 6, 7) is forwarded towards the high-reliability radio link.

According to the second embodiment of the present invention, the data traffic may be distributed over the first radio link and the second radio link on the basis of the sets of distribution rules illustrated in the distribution table of FIG. 6b. Also in this case, low priority data traffic is distributed over the high-capacity radio link in most conditions, while data traffic with high priority is forwarded towards the high-reliability radio link. However, this second embodiment provides some advantages over the first embodiment in more critical situations. Indeed, according to the considered distribution rules, in case of deep fading (corresponding to the operating status labeled with the index C in the distribution table of FIG. 6b), data traffic related to browsing (i.e. packets having a CoS value equal to 0) may be dropped instead to overload the queues of the ODUs. Moreover, in case the high-capacity link is down (corresponding to the operating status labeled with the index D in the distribution table of FIG. 6b), a portion of the low priority data traffic, in particular the portion exceeding CIR (namely, the packets with CoS value equal to 0 or 4) may be dropped, while the portion of low priority traffic under CIR (namely, the packets with CoS value equal to 1 or 2) may be forwarded towards the high-reliability radio link. Advantageously, as far as browsing is considered, this allows keeping the client sessions alive. Finally, in case the high-reliability radio link is down (corresponding to the operating status labeled with the index E in the distribution table of FIG. 6b), all packets are forwarded towards the high-capacity radio link. In case of fading over the high-capacity link, the delivery of the high priority data traffic is guaranteed.

The method according to the present invention provides some advantages. Indeed, it allows ensuring the lowest probability of packet dropping to the high priority data traffic by guaranteeing the CIR over the aggregated radio links, and allows optimizing the usage of the available bandwidth in low fading conditions over the radio links. The processing needed for the data traffic distribution is performed entirely in the IDUs, so that no specific features are required in the ODUs. Hence, commercial outdoor equipment may be advantageously used and a multi-vendor approach may be pursued, wherein the IDU and the ODUs are possibly provided by different vendors, so as to reduce costs, while allowing to also reduce the computational complexity. In particular, the ODUs may implement their own QoS capabilities without interacting with the distribution algorithm. Besides, the method according to the present invention allows distributing the data traffic by preserving the packet order of each packet flow as packets having the same value of the priority parameter are forwarded towards the same radio link. Finally, the method allows a simple implementation as it merely requires configuring the IDUs (which may be general purpose routers) with the distribution rules, without requiring more complex implementations possibly based on dedicated protocols to manage the traffic distribution over the radio links.

The invention claimed is:

1. A method for distributing packets of a data traffic over aggregated radio links connecting a node of a packet-switched wireless communication network to a further node of said packet-switched wireless communication network, said aggregated radio links comprising a first radio link and a second radio link, said method comprising, at an indoor device of said node:
   a) configuring at least one set of distribution rules indicating, for each of said first radio link and second radio link, an association between said radio link and a subset of values of a priority parameter carried within said packets; and
   b) upon reception of a packet of said data traffic, distributing said packet over said first radio link or said second radio link on the basis of the priority parameter value carried within said packet and said associations,
   wherein each set of distribution rules is associated with a corresponding operating status of said aggregated radio links, and
   step b) comprises distributing said packets on the basis of a number of different sets of distribution rules, wherein the method further comprises, before said distributing, selecting one of said different sets of distribution rules on the basis of said operating status of said aggregated radio links.

2. The method according to claim 1, wherein said first radio link and said second radio link are operated over different frequency bands.

3. The method according to claim 2, wherein said priority parameter is the class of service value of said packets.

4. The method according to claim 1, wherein said priority parameter is comprised in a layer 2 or layer 3 header of the packet.

5. The method according to claim 1, wherein said at least one set of distribution rules comprises rules associating a respective subset of values of said priority parameter with each of said first radio link and said second radio link.

6. The method according to claim 1, wherein said operating status of said aggregated radio links is indicative of an actual fading condition of said aggregated radio links and/or of an operating condition of input and output ports of the aggregated radio links.

7. The method according to claim 1, wherein said at least one set of distribution rules comprises one or more rules indicating one or more values of said priority parameter of packets to be dropped.

8. The method according to claim 1, further comprising, at step a), storing said at least one set of distribution rules in a database.

9. The method according to claim 1, wherein the method further comprises, before said selecting, determining a current status of said aggregated radio links on the basis of information indicative of the performance of said aggregated radio links.

10. A non-transitory computer-readable medium storing computer-readable instructions that, when executed by a computer, cause the computer to perform the method according to claim 1.

11. An indoor device for a node of a packet-switched wireless communication network, said node being connected to a further node of said packet-switched wireless communication network through aggregated radio links including a first radio link and a second radio link, said indoor device comprising:
   a database configured to store at least one set of distribution rules indicating, for each of said first radio link and second radio link, an association between said radio link and a subset of values of a priority parameter carried within a packet; and
   a processor configured to, upon reception of a packet of said data traffic, distribute said packet over said first radio link or said second radio link on the basis of the priority parameter value carried within said packet and said associations,
   wherein each set of distribution rules is associated with a corresponding operating status of said aggregated radio links, and
   the processor distributes said packet on the basis of a number of different sets of distribution rules, and the processor is further configured to, before said distributing said packet, select one of said different sets of distribution rules on the basis of said operating status of said aggregated radio links.

12. The indoor device according to claim 11, wherein said database is configured to store at least two different sets of distribution rules, and wherein the indoor device further comprises:
   a first link status detector configured to determine a current status of the first radio link;
   a second link status detector configured to determine a current status of the second radio link; and
   a selector configured to select one set of distribution rules among said at least two different sets of distribution rules for distributing said packet over said first radio link or said second radio link, said selection being based on said determined current status of the first radio link and said determined current status of the second radio link.

* * * * *